United States Patent
Norp et al.

(10) Patent No.: US 12,520,359 B2
(45) Date of Patent: Jan. 6, 2026

(54) DUAL-CONNECTION DEVICE ENABLING SERVICE ADVERTISEMENT AND DISCOVERY OF SERVICES BETWEEN NETWORKS, USER DEVICE AND SYSTEM

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Antonius Norp, The Hague (NL); Pascal Mathieu Agnes Marie Heijnen, Sittard (NL)

(73) Assignees: Koninklijke KPN N.V., Rotterdam (NL); Nederlandse Organisatie Voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 315 days.

(21) Appl. No.: 18/268,116

(22) PCT Filed: Dec. 16, 2021

(86) PCT No.: PCT/EP2021/086304
§ 371 (c)(1),
(2) Date: Jun. 16, 2023

(87) PCT Pub. No.: WO2022/136128
PCT Pub. Date: Jun. 30, 2022

(65) Prior Publication Data
US 2024/0008117 A1    Jan. 4, 2024

(30) Foreign Application Priority Data
Dec. 21, 2020 (EP) .................................. 20215958

(51) Int. Cl.
*H04W 76/15* (2018.01)
*H04W 8/00* (2009.01)
(Continued)

(52) U.S. Cl.
CPC ........... *H04W 76/15* (2018.02); *H04W 8/005* (2013.01); *H04W 48/16* (2013.01); *H04W 88/04* (2013.01)

(58) Field of Classification Search
CPC ... G06F 18/2431; G06F 18/214; G06N 3/045; G06N 3/088; G06N 3/047; G06N 3/063;
(Continued)

(56) References Cited

U.S. PATENT DOCUMENTS

2009/0282458 A1* 11/2009 Hjelm ..................... H04L 69/24
  726/1
2012/0079128 A1*  3/2012 Stirbu ................... H04L 67/104
  709/230
(Continued)

FOREIGN PATENT DOCUMENTS

EP       1657939 A1     5/2006
WO   2018227039 A1   12/2018

OTHER PUBLICATIONS

PCT International Search Report and Written Opinion of the International Searching Authority for international application No. PCT/EP2021/086304 filed on Dec. 16, 2021 dated Apr. 12, 2022.
(Continued)

*Primary Examiner* — Juan A Torres
(74) *Attorney, Agent, or Firm* — Hamilton, Brook, Smith & Reynolds, P.C.

(57) ABSTRACT

One aspect of this disclosure pertains to a dual-connection device configured to connect: to a local network as a local device, the local network connecting the dual-connection device and one or more further local devices providing one or more local services in the local network; and to a telecommunications network as a user device, wherein the telecommunications network has registered a user device group comprising the dual-connection device and one or more further user devices in the telecommunications net-
(Continued)

| IP address on LAN | 192.168.2.36 | | | | |
|---|---|---|---|---|---|
| IP Address 5GLAN | 10.0.35.3 | | | | |
| LAN device | Device LDx active on LAN | Services | Currently available on LAN | Set to be used on the 5GLAN | Authorization UE required for service (optional) |
| LD1 (printer) | LD1 ✓ | Network printer | ✓ | ✓ | X |
| LD2 (NAS) | LD2 ✓ | File sharing | ✓ | X | - |
| LD2 (NAS) | | Media streaming | ✓ | ✓ | - |
| LD2 (NAS) | | Printer sharing | ✓ | X | - |
| LD3 (Laptop) | LD3 ✓ | File sharing | ✓ | X | - |
| LD4 | LD4 ✓ | - | X | X | - |
| LD5 | LD5 ✓ | - | X | X | - |
| LD6 | LD6 X (powered down) | File server | X | X | - | work; The dual-connection device is further configured to enable at least one of advertisement of and discovery of at least one of the one or more local devices and one or more local services available in the local network for the one or more further user devices in the user device group in the telecommunications network. The dual-connection device may further be configured to enable at least one of advertisement of and discovery of at least one of the one or more further user devices in the user device group and one or more services provided by the one or more further user devices for the one or more local devices in the local network.

19 Claims, 9 Drawing Sheets

(51) Int. Cl.
*H04W 48/16* (2009.01)
*H04W 88/04* (2009.01)

(58) Field of Classification Search
CPC ..... G06N 3/084; G06T 2200/24; G06T 11/60; G06V 10/774
USPC .......................................................... 455/434
See application file for complete search history.

(56) References Cited

U.S. PATENT DOCUMENTS

| | | | |
|---|---|---|---|
| 2012/0128006 A1* | 5/2012 | Petersson | H04L 65/1073 370/401 |
| 2013/0143542 A1* | 6/2013 | Kovvali | H04W 48/18 455/418 |
| 2014/0204904 A1* | 7/2014 | Xiang | H04W 36/00226 370/331 |
| 2017/0026472 A1* | 1/2017 | Bugenhagen | H04L 63/10 |
| 2017/0104839 A1* | 4/2017 | Starsinic | H04W 40/34 |
| 2017/0142763 A1* | 5/2017 | Bao | H04W 76/14 |
| 2017/0366983 A1* | 12/2017 | Gunasekara | H04L 43/0811 |
| 2020/0228948 A1* | 7/2020 | Watfa | H04W 48/16 |
| 2021/0185582 A1* | 6/2021 | Vivanco | H04W 36/326 |
| 2022/0158976 A1* | 5/2022 | Kefford | H04L 41/04 |

OTHER PUBLICATIONS

Bruda, Stefan D. et al, "A Peer-to-Peer Architecture for Remote Service Discovery", 2012, vol. 10, p. 976-983, (2012).

"3rd Generation Partnership Project; Technical Specification Group Services and System Aspects; Study on enhancement of 5G System (5GS) for vertical and Local Area Network (LAN) services (Release 16)", vol. SA WG2, Jun. 10, 2019 (Jun. 10, 2019).

Buford. J., et al: "An integrated peer-to-peer data and service dissemination system." 2007 4th Annual IEEE Consumer Communications and Networking Conference, CCNC 2007. pp. 546.549.

* cited by examiner

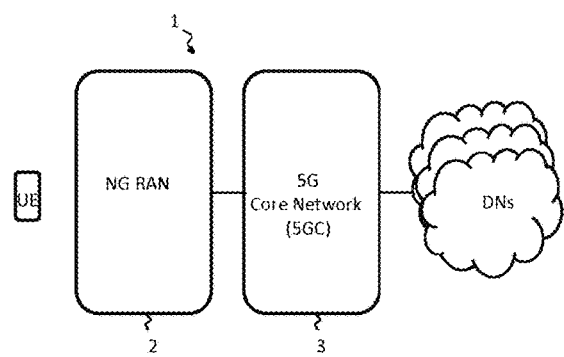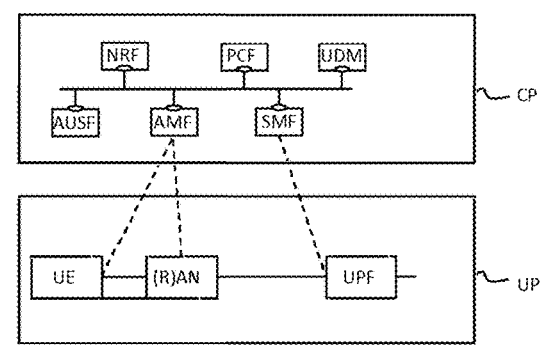
PRIOR ART
PRIOR ART
FIG. 3A
FIG. 3B

| IP address on LAN | 192.168.2.36 | | | | |
|---|---|---|---|---|---|
| IP Address 5GLAN | 10.0.35.3 | | | | |
| LAN device | Device LDx active on LAN | Services | Currently available on LAN | Set to be used on the 5GLAN | Authorization UE required for service (optional) |
| LD1 (printer) | LD1 ✓ | Network printer | ✓ | ✓ | X |
| LD2 (NAS) | LD2 ✓ | File sharing | ✓ | X | - |
| LD2 (NAS) | | Media streaming | ✓ | ✓ | - |
| LD2 (NAS) | | Printer sharing | ✓ | X | - |
| LD3 (Laptop) | LD3 ✓ | File sharing | ✓ | X | - |
| LD4 | LD4 ✓ | - | X | X | - |
| LD5 | LD5 ✓ | - | X | X | - |
| LD6 | LD6 X (powered down) | File server | X | X | - |

FIG. 6

DUAL-CONNECTION DEVICE ENABLING SERVICE ADVERTISEMENT AND DISCOVERY OF SERVICES BETWEEN NETWORKS, USER DEVICE AND SYSTEM

This application is the U.S. National Stage of International Application No. PCT/EP2021/086304, filed Dec. 16, 2021, which designates the U.S., published in English, and claims priority under 35 U.S.C. § 119 or 365(c) to EP Application Serial No. 20215958.8, filed Dec. 21, 2020. The entire teachings of the above applications are incorporated herein by reference.

TECHNICAL FIELD

The present disclosure relates to service advertisement and/or discovery of services between networks. In particular, the disclosure relates to a dual-connection device configured for providing such service advertisement and/or discovery of local services in a telecommunications network, e.g. for a group of user devices in such a telecommunications network and vice versa. Optionally, the dual-connection device may handle the service request itself.

BACKGROUND

Over the past decade, local area networks (LAN) have evolved rapidly and today include multiple devices, such as computers, security devices, home-automation devices, printers, energy monitoring and control devices etc. Such local area networks may be wired (in part) or wireless. Nowadays, people are also accustomed to mobility while operating computing devices, primarily smart phones, connected to a wide-area network, such as a telecommunications network.

Over the past few years, attempts have been made to enable communications between user devices in a wide area network to local devices in a local area network. One example includes accessing local devices through a cloud service, wherein both the local device in a local network and a user device in the telecommunications network connect to the cloud service. In this manner, instructions from the user device can be provided to local devices and information can be obtained by the user device in the telecommunications network from the local device. Drawbacks of cloud services include that for different local devices, different associated cloud services need to be used and that the user device in the telecommunications network needs to keep many connections to these cloud services.

SUMMARY

With the advent of newer generations of telecommunications networks, such as 5G telecommunications networks currently being deployed, the promise of an internet-of-things has come closer. All devices in the local network, including printers, home-automation devices, printers, etc. may connect directly to the 5G telecommunications network. For that to happen, these local devices need to have 5G connectivity, using dedicated internal circuitry or a USB-dongle, for example and may also need to have a subscription in the telecommunications network, using a SIM card, for example.

Arranging for subscriptions for many local devices in the telecommunications network is cumbersome and not efficient. Adding 5G connectivity for local devices is often not possible because of the lack of a suitable interface, such as the USB interface for a 5G-dongle. Replacing local devices is therefore required in many situations to obtain 5G connectivity.

In the present disclosure, a dual-connection device is proposed that is configured to connect to at least two network domains, e.g. network domains of two different networks, such as a local network and a telecommunications network. The dual-connection device is configured for advertisement (also referred to as service announcement) and/or discovery of services in at least one of the network domains. In particular, one or more network domains may comprise one or more devices offering one or more services and the visibility and availability of these services can be advertised to or discovered by devices in the other network domain(s) via the dual-connection device. Services may also be provided via the dual-connection device. If one of the network domains comprises a telecommunications network, the devices may be grouped into a device group within which advertisement and discovery message exchanges occur. The device may, optionally, be configured to enable selection (e.g. by a user) of which devices and/or services may be made visible and/or accessible for devices in the other network domain.

In particular, in the present disclosure, a dual-connection device is proposed that is configured to connect both to a local network and to a telecommunications network. In the local network, the dual connection device may be configured to become aware of further local devices and/or further services in the local network. Furthermore, the dual-connection device may be configured to become aware of further user devices and/or services of these further user devices in the telecommunications network. In the telecommunications network, the dual-connection device may be configured to inform a group of user devices in the telecommunications network of any further local devices and/or further services in the local network provided in the local network. Furthermore, in the local network, the dual-connection device may be configured to inform further local devices in the local network of any further user devices and/or services of these user devices provided in the telecommunications network. The device may, optionally, be configured to enable selection (e.g. by a user) of which further local devices and/or services resp. which further user devices and/or which services thereof may be made visible and/or accessible for the group of devices in the telecommunications network resp. may be made visible and/or accessible for local devices in the local network.

One aspect of the disclosure, pertains to a dual-connection device configured to connect:

to a local network as a local device, the local network connecting the dual-connection device and one or more further local devices providing one or more local services in the local network; and to a telecommunications network as a user device, wherein the telecommunications network has registered a user device group comprising the dual-connection device and one or more further user devices in the telecommunications network.

The dual-connection device may, for example, be considered connected to both the local network and the telecommunications network when it has received an address, such as an IP address in both the local network and in the telecommunications network. The address of the dual-connection device in the local network is used in the local network and the address of the dual-connection device in the telecommunications network is used in the telecommunications network. Addresses in the networks for the dual-connection device may be configured in various manners, including providing static address(es), dynamically allocating the address(es) or auto-generation of the address by the dual-connection device.

The dual-connection device is further configured to enable at least one of advertisement of and discovery of at least one of the one or more local devices and one or more local services available in the local network for the one or more further user devices in the user device group in the telecommunications network.

Alternatively, or in addition, the dual-connection device is further configured to enable at least one of advertisement of and discovery of at least one of the one or more further user devices in the user device group and one or more services provided by the one or more further user devices for the one or more local devices in the local network.

The dual-connection device is an intermediate device configured to allow connectivity to both the local network with further local devices/local services and to a telecommunications network. The local network may be a conventional network, e.g. a non-3GPP network, such as an Ethernet network or wireless 802.x network or a Zigbee network. The further local devices may include any device connected to a local network, including e.g. printers, network storage devices, control devices, media streaming devices, sensors, actuators, etc. The further local devices do not require (but may still have) a subscription in the telecommunications network or connectivity to that telecommunications network. The dual-connection device may also have connectivity to the telecommunications network and may be subscribed to a group of further user devices. These further user devices may be user equipment, UE, as defined by 3GPP.

In this disclosure, the dual-connection device extends the local network, or at least a part thereof, into the telecommunications network, or at least into a virtual network (e.g. a 5G LAN) containing the group of further user devices, so that services offered by at least one further local device in the local network can be advertised, discovered and/or provided to at least one further user device in the virtual network. For that to happen, the dual-connection device may be configured to advertise the local service(s) amongst the devices in the group or respond to a service discovery request from a further user device in the group.

The dual-connection device may be configurable to select which further local device(s) and/or further local service(s) should be visible and/or accessible from the virtual network.

Vice versa, in this disclosure, the dual-connection device may, alternatively or in addition, extend a part of the telecommunications network (the part associated with the group of the dual-connection device and the further user devices) into the local network, so that services offered by at least one further device in the device group in the telecommunications network can be advertised, discovered and/or provided to a local device in the local network. For that to happen, the dual-connection device may be configured to advertise the service(s) of the further user device amongst the local devices or respond to a service discovery request from a further local device in the local network. One example includes the availability of devices in other local networks connected to the telecommunications network via another dual-connection device in the same device group. Both dual-connection devices may be members of the same device group.

The dual-connection device may be configurable to select which further user device and/or further services thereof should be visible and/or accessible from the virtual network.

It should be appreciated that the dual-connection device does not need to be connected continuously to both networks and that the order of connecting, if connections have not yet been made, is irrelevant for purposes of the disclosure.

It should also be appreciated that the dual-connection device may have an identity module, such as a SIM, USIM, ISIM or eSIM, containing information enabling the telecommunications network to identify the user device group(s) to which it belongs.

In one embodiment, the dual-connection device may be configured to advertise at least one further local device and/or at least one local service by broadcasting information about the availability of the further local device and/or local service amongst the further user devices in the user device group.

Alternatively or in addition, the dual-connection device may be configured to advertise at least one further user device and/or service of the further user device by broadcasting information about the availability of the further user device and/or service of the user device amongst the local devices in the local network.

Broadcasting information can be done by the dual-connectivity device by sending IP packets with a broadcast IP address, or multicast IP address on the local network and/or by sending IP packets with either a broadcast IP address or multicast IP address via a PDU session that is used for communication with the further user devices in the user device group.

The embodiment restricts the broadcast to the group of further user devices without bothering other user devices in the telecommunications network with the information. The embodiment may also ensure privacy and security of the local network and local devices on the local network against user devices that are not intended to have access to the local devices and local services as provided by the local devices.

In one embodiment, the dual-connection device may be configured for discovery of at least one further local device and/or at least one local service by receiving a discovery request for availability of the further local device and/or local service from a further user device of the user device group and to provide information about available further local devices and/or local services to the at least one further user device.

Alternatively or in addition, the dual-connection device may be configured for discovery of at least one further user device and/or at least one service of the further user device by receiving a discovery request for availability of the further user device and/or service of the further user device from a further local device in the local network and to provide information about available further user devices and/or services of said further user devices to the further local device in the local network.

The embodiment facilitates service discovery from the further user device in the telecommunications network resp. the further local device in the local network with the dual-connection device for devices and/or services available in the local network resp. the telecommunications network (or, at least, the group of further user devices in the telecommunications network). The response from the dual-connection device may be a broadcast amongst the group of devices (so that each further user device in the group is aware of the availability of the further local device and/or local service) resp. the local devices in the local network. The response from the dual-connection device may also be a direct response to the further user device resp. the further local device that issued the service discovery request.

In one embodiment, the dual-connection device may further be configured to receive a service request from a further user device of the user device group for an advertised or discovered local service of a further local device in the local network and to relay the service request to the further local device in the local network to provide the requested local service to the further user device in the telecommunications network.

Alternatively, or in addition, the dual connection device may further be configured to receive a service request from a further local device in the local network for an advertised or discovered service of a further user device in the user device group in the telecommunications network and to relay the service request to the further user device in the telecommunications network to provide the requested service of the further user device to the local user device in the local network.

The embodiment facilitates that not only devices/services from the local network resp. the devices/services from the further user devices in the user device group can be advertised or discovered but these can also be used through the dual-connection device. Relaying the service request may involve adaptation of the addresses, filtering of service requests and/or transmission protocol conversion if needed.

In one embodiment, the dual connectivity device may check that the service request is received from a further user device in the group of user devices resp. from a further local device on the local network, e.g. based on the connection via which the service request was received.

In one embodiment, the group of user devices comprises the dual connection device and at least one further user device, wherein the at least one further user device is a further dual-connection device connected to a further local network. The further local network may be a local network, distinct from the local network described previously. The further local network may be physically remote from the local network. The further local network may contain the further dual-connection device and one or more further local devices providing one or more further local services. The dual-connection device and further dual-connection device may be part of the same group of user devices.

The embodiment facilitates further extension of network domains for service advertisement and discovery.

In one embodiment, the dual-connection device is configured for device-to-device communication with one or more further user devices in the group of user devices in the telecommunications network. When the group of user devices consists of the dual-connection device and two or more further user devices, the dual-connection device is configured for one-to-many direct communication and the group of user devices is a Proximity Services, ProSe, group. The group may, in one embodiment, be defined by a ProSe group identifier.

One-to-one and one-to-many direct communication is specified in, for example, 3GPP TS 23.303 for 4G telecommunications networks and 3GPP TR 23.752 for 5G telecommunications networks. The dual connectivity device and further user devices may use a ProSe Group IP multicast address for the direct communication.

In one embodiment, the dual-connection device may be configured to register as a user device in a 3GPP telecommunications network, for example a 3GPP 5G, 6G or future telecommunications network. In one embodiment, the user device group is a 5G virtual network group comprising one or more further user devices. 5G virtual network groups have recently be defined as part of 5G LAN-type services in 3GPP TS 23.501, v16.0.0, clause 5.29 and 3GPP TS 22.261, v18.0.0, clause 6.26 and enable definition of a closed group of user devices, defined e.g. in the subscription of each of the user devices. The closed group enables restricted service discovery and advertisement of services and secure communications.

The dual-connection device may check that a service request or discovery request is received from a further user device in the user device group instead of from another user device on the telecommunications network, e.g. by checking that the request was received via a specific connection (e.g. PDU session) that the dual-connection device has established for communication with other devices in the group.

In one embodiment, the dual-connection device is configured to establish a packet data unit, PDU, session (e.g. fora data network name, DNN) associated with a 5G virtual network group of the one or more further user devices to send or receive service advertisements and/or service discovery requests via the established PDU session. The dual-connection device may use the established PDU session for communications with the one or more further user devices in the group of user devices. Optionally, the dual-connection device is configured to verify whether communication such as service discovery and/or service requests are received from user devices within the group of user devices, for example by verifying that the communication is received via the PDU session with a DNN associated with the 5GLAN virtual network group. This embodiment recognizes that within the 5GLAN concept of a closed group of user devices, only user devices that are member of the 5GLAN virtual network group exchange communication with other members of the 5GLAN virtual network group via PDU sessions to the DNN associated with the 5GLAN virtual network group. Devices that are not subscribed to the 5GLAN virtual network group are not permitted by the telecommunication network to establish a PDU session towards the DNN associated with the 5GLAN virtual network group. Data communication between user devices within the 5GLAN virtual network group exclusively uses these PDU sessions and no other user devices than those that are part of the 5GLAN virtual network group are permitted to insert data into these PDU sessions.

In one embodiment, the dual-connection device may be configured to obtain and, optionally, update information about available further local devices and/or local services in the local network.

Alternatively, or in addition, the information may comprise available further user devices and/or services of these further user devices in the telecommunications network, e.g. in the user device group.

Accordingly, the dual-connection device is aware of the available local devices and/or local services in the local network resp. the available further user devices and/or services thereof in the telecommunications network, e.g. the further user devices and/or services thereof in the user device group. Hence, the dual-connection device may be aware which of these local devices resp. further user devices and/or local services resp. services of further user devices should be made visible and/or accessible from the telecommunications network, particularly amongst the group of user devices in a virtual network, resp. from the local network.

When local devices are added to the local network, these may be added to the devices for which the dual-connection device manages visibility and/or accessibility for the group of user devices in the telecommunications network. Likewise, when further user devices are added to the user device group, these may be added to the further user device for which the dual-connection device manages visibility and/or accessibility for the local devices in the local network.

An administrator for the dual-connection device may be informed by the dual-connection device about a newly added local device resp. a newly added further user device. Likewise, the dual-connection device may take account of local devices resp. further user device that are (temporarily) no longer available in the local network.

In one embodiment, the dual-connection device may be configured to control advertisement and/or discovery of at least one of the further local devices and local services in accordance with control information. The control information may, as an example, comprise permissions and/or restrictions for advertisement and/or discovery of one or more further local devices and/or local services. The control information may enable control regarding information to be sent to the telecommunications network on further local devices/and or services on the level of an individual further local device and/or local service or groups thereof. Control information may include whether or not a further local device (e.g. a printer, a network attached storage (NAS), a laptop, etc.) and/or local service (e.g. a file server of the NAS is visible, but a streaming server is not) is visible and/or accessible in the telecommunications network and/or whether the service of the local device is accessible.

In addition or alternatively, the dual-connection device is configured to control service request processing for a service request from at least one of the further user devices resp. further local devices in accordance with control information, wherein the control information comprises permissions and/or restrictions for service requests from one or more further user devices resp. further local devices. The embodiment facilitates controlling of service request processing once a further user device resp. a local device is made aware of the availability of the service.

In one embodiment, the dual-connection device may be configured to perform an authorization procedure (e.g. user name/password or certificates) to control accessing at least one further local device and/or using at least one local service by a further user device in the telecommunications network.

Alternatively, or in addition, the dual-connection device may be configured to perform an authorization procedure (e.g. user name/password or certificates) to control accessing at least one further user device and/or using at least one service of a further user device by a further local device in the local network.

In this manner, one or more further local devices and/or local services resp. one or more further user devices and/or services provided by these further user devices can enjoy additional protection, such that only further user devices in the group of devices resp. further local devices in the local network successfully performing authorization get access to the further local device and/or local service resp. the further user device and/or service provided by the further user device.

In one embodiment, the dual-connection device may be configured to store the control information and/or authorization information and to enable setting and/or adaptation of the control information and/or authorization information. Administrator setting of the control information provides for flexibility in defining permissions/and or restrictions with regard to further local devices and/or local services. For example, the dual-connection device may offer a web interface allowing an administrator to set control information. The web interface may, for example, exist towards local devices in the local network and/or further user devices in the user device group, because only such a device can get an IP address of the dual-connection device. The dual-connection device may include setting(s) who and/or which devices under which conditions (e.g. present within the local network and not in the telecommunications network) can access the control information in the dual-connection device. For example, the administrator may possess a user name/password to access the dual-connection device.

In one embodiment, the dual-connection device may be configured to control advertisement and/or discovery of at least one of the further local devices and local services in accordance with status information of the one or more further local devices.

Alternatively, or in addition, the dual-connection device may be configured to control advertisement and/or discovery of at least one of the further user devices and services of these user devices in accordance with status information of one or more of the further user devices.

Apart from the administrator-defined control information, status information (e.g. defective, out-of-power, switched off, printer out of paper) regarding further local devices in the local network resp. further user devices in the telecommunications network may influence visibility and/or accessibility of these devices and may therefore be registered in the dual-connection device. Service messages from service providing devices may be transmitted or forwarded by the dual connection device towards other devices in the other network domain in one embodiment.

In one embodiment, a plurality of sets of control information may be stored in the dual-connection device, each set being associated with a separate user device group or a sub-group of further user devices of the user device group. In this manner, the dual-connection device may be used for multiple groups of user devices, e.g. for multiple virtual networks, or control information may be applicable for one or more further user devices in the telecommunications network within the user device group.

In one embodiment, the dual-connection device is a stand-alone, self-contained device to be positioned in the local network. The stand-alone device may have a plug connector so that it can be easily connected to power and be available at all times. However, in another embodiment, the dual-connection device may also be integrated in a further local device in the local network, e.g. in a printer, a network attached storage or in any other local device. In yet another embodiment, the dual-connection device, or its function, may be implemented in a gateway device, e.g. in a 5G residential gateway (5G-RG) that provides the local network. In general, a gateway device provides a local network in that it is a gateway between the local network, typically a private network, for example a residential network, and other networks, typically public networks, such as the Internet and/or telecommunications networks.

In one embodiment, the dual-connection device is configured for transmitting information to the further user devices about at least one of the dual-connection device and the local network. Information regarding the dual-connection device may comprise that the dual-connection device represents a plurality of further devices, for example, further local devices. Information regarding the local network, may include information about further local devices and/or local services in the local network. The information may be used by a further user device in the telecommunications network, e.g. in the group of user devices, to adapt further communications.

Other aspects of the present disclosure relate to a method in a dual-connection device and for a computer program comprising software instructions that, when run by a dual-connection device, cause the device to perform such a method.

One such aspect pertains to a method in a dual-connection device comprising the steps of:
connecting to a local network as a local device, the local network connecting the dual-connection device and one or more further local devices providing one or more local services in the local network; and
connecting to a telecommunications network as a user device, wherein the telecommunications network registers a user device group comprising the dual-connection device and one or more further user devices in the telecommunications network.

In one aspect, the method may further comprise the step of at least one of advertising and discovery of at least one of the one or more local devices and one or more local services available in the local network for the one or more further user devices in the user device group in the telecommunications network.

Alternatively, or in addition, the method may further comprise the step of at least one of advertising and discovery of at least one of the one or more further user devices in the user device group and one or more services provided by the one or more further user devices for the one or more local devices in the local network.

The sequence of the steps may be changed.

Other aspects of the method comprise steps in the dual-connection device for which the device is configured according to the dependent claims 2-14 and/or the present disclosure.

Yet another aspect of the disclosure pertains to a user device, e.g. a 3GPP UE, for communicating over a telecommunications network. The user device may be configured to establish communication in the telecommunications network to a group of devices, e.g. devices in a 5GLAN, that also comprises the dual-connection device. As described above, the dual-connection device may be connected to a plurality of further local devices in a local network providing one or more local services.

The user device is configured to receive and process a service advertisement and/or a discovery request from the dual-connection device. The service advertisement from the dual-connection device may relate to further local devices and/or local service of a local network and may be received over the telecommunications network. The discovery request may relate to services of the user device and is received over the telecommunications network.

The service advertisement and/or discovery request may contain information regarding the dual-connection device and/or the local network. Information regarding the dual-connection device may comprise that the dual-connection device represents a plurality of further devices, for example, further local devices. Information regarding the local network, may include information about further local devices and/or local services in the local network. The information may be used by further user device in the telecommunications network, e.g. in the group of user devices, to adapt further communications. The information may be a standardized identifier, a reference to information, identifier or any other information element (e.g. a protocol information element) directly or indirectly providing information about the dual-connection device and/or local network.

The user device is configured to recognize the information in the service advertisement and/or discovery request, and may store the information and/or may adapt one or more further communications based on the information.

In this manner, the user device is informed of the special nature of the dual-connection device in the group of devices, e.g. in the 5GLAN. Adaptation of communications of the user device may involve responding to the discovery request directly to the dual-connection device.

In one embodiment, the adaptation of the communications comprises sending service advertisements and/or discovery requests directly to the dual-connection device. Such direct communications may be sent instead of broadcasting the service advertisements and/or service discovery request within the group of devices to reduce message flows in the group. The direct communication may also be performed in addition to the broadcast of the service advertisements and/or service discovery request.

As will be appreciated by one skilled in the art, aspects of the present invention may be embodied as a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all. generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the person's computer, partly on the person's computer, as a stand-alone software package, partly on the person's computer and partly on a remote computer, or entirely on the remote computer or server. In the latter scenario, the remote computer may be connected to the person's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Moreover, a computer program for carrying out the methods described herein, as well as a non-transitory computer readable storage-medium storing the computer program are provided.

Elements and aspects discussed for or in relation with a particular embodiment may be suitably combined with elements and aspects of other embodiments, unless explicitly stated otherwise. Embodiments of the present invention will be further illustrated with reference to the attached drawings, which schematically will show embodiments according to the invention. It will be understood that the present invention is not in any way restricted to these specific embodiments.

BRIEF DESCRIPTION OF THE DRAWINGS

Aspects of the invention will be explained in greater detail by reference to exemplary embodiments shown in the drawings, in which:

FIGS. 3A-3B are schematic illustrations of a 5G network architecture and 5G core network according to the prior art;

FIG. 6 is a schematic illustration of a data structure with control information and status information of local devices and local services.

DETAILED DESCRIPTION OF THE DRAWINGS

FIGS. 1A-1D are schematic illustrations of deployment of dual-connection devices DCD connected to network domains d1, d2, d3 in different cases.

Network domains d1, d2, d3 may be domains of identical or different networks. The networks may provide wired or wireless access. In one example, network domains d1, d3 may be network domains of a wireless local area network, LAN, whereas network domain d2 is a domain in a telecommunications network as, for example, a telecommunications network for wireless access as standardized by 3GPP (GSM, GPRS, UMTS, LTE, 5G, 6G, future generation, etc.).

Each of the network domains d1, d2, d3 contains one or more devices D1-D9. The subscript identifies the domain d of the network in which the devices D1-D9 are currently connected. The dual-connection device DCD is connected to at least two domains as shown by the overlap and the subscripts d1, d2 (and d2, d3 in FIG. 1D). The network domains define groups of devices D, e.g. a group of devices in a local area network or in a virtual network group of a telecommunications network. The virtual network group may be a 5GLAN or a ProSe group.

Figure 1A:
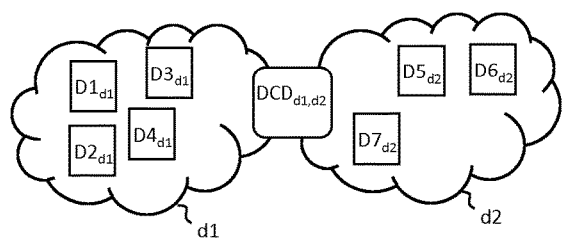
FIGS. 1A-1D are schematic illustrations of deployment of dual-connection devices connected to network domains in different cases.

In FIG. 1A, network domain d1 contains devices D1-D4, whereas network domain d2 contains devices D5-D7. One or more of the devices D may offer a service to other devices in the respective domains d1 and/or d2. Examples of such services are printing services, file services, streaming services, etc. In the prior art, the availability of devices D and/or services may be advertised by a service providing device D within a domain wherein the device is connected. Alternatively, devices D may poll other devices within the domain for available services. For example, device D4 may be a printer offering printing services within domain d1 to other devices D1-D3 in the domain d1. To that end, device D4 advertises the availability of the printing service in domain d1.

Dual-connection device DCD is connected to both network domain d1 and network domain d2, for example, by having an IP address in both domains d1, d2. As a result, the dual-connection device DCD may listen to advertisements (announcements) of services from devices D in one domain d1 and/or d2 and register the availability of these devices and the services provided by these devices. Likewise, the DCD may poll devices in any domain to which it is connected and obtain the available devices and associated services in the domains.

The dual-connection device DCD may itself be configured for advertisement and/or discovery of services in at least one, but preferably any, of the network domains in which it exists. In particular, the dual-connection device DCD may advertise services available from devices in one network domain, e.g. domain d1, to devices in the other network domain d2, using, for example, UPnP, bonjour, zeroconf, etc. Likewise, devices in one domain, e.g. domain d1, may poll the dual-connection device DCD, for the availability of devices and/or services in the other domain, e.g. domain d2. For example, the dual-connection device DCD may advertise the availability of a printing service from device D4 (present in domain d1) in the network domain d2. Alternatively, a device D7 in the network domain d2 may poll the DCD for the availability of a printing service and receive information from the dual-connection device DCD that a printing service is available (viz. from device D4 in the domain d1). As another example, device D1 in network domain d1 may request a service. The request is received by the dual-connection device DCD and the dual-connection device DCD may inform the device D1 that the service is available in the network domain d2 (e.g. a device in a car providing a car monitoring service that can be approached from the device D1 in a LAN).

Service advertisements and polling for services are restricted to devices in the network domain, such that not all devices in a network are necessarily receiving such signalling. Such a defined network domain may be beneficial in a telecommunications network to avoid that all devices in this network receive such signalling.

The service itself may also be provided via the dual-connection device DCD. For example, a printing command may be received by dual-connection device DCD from device D7 in network domain d2 and be relayed to printer D4 in network domain d1. The relay may comprise the adaptation of IP addresses for communications with the respective domains. Other signal adaptations may be performed for the relay operations.

In one embodiment, the user device group is a 5G virtual network group comprising the dual-connection device DCD and UE, D5. 5G virtual network groups are defined as part of 5G LAN-type services in 3GPP TS 23.501, v16.0.0, clause 5.29 and 3GPP TS 22.261, v18.0.0, clause 6.26 and enable definition of a closed group of user devices, defined e.g. in the subscription of each of the user devices. The closed group enables, for example, restricted service discovery and advertisement of services and secure communications.

The dual-connection device DCD may, optionally, be configured to enable selection (e.g. by a user, such as a user owning one of the domains) of which devices and/or services may be made visible and/or accessible for devices in the other network domain. To that end, the dual-connection device DCD has access to control information and/or status information. The control information may, as an example, comprise permissions and/or restrictions for advertisement and/or discovery of devices and/or services in and between respective domains. For example, a user may set that a printing service is available from device D4 for all devices in the network domain d2. Service messages from printer D4 may also be relayed to device D7 by the dual-connection device DCD.

Figure 1B:
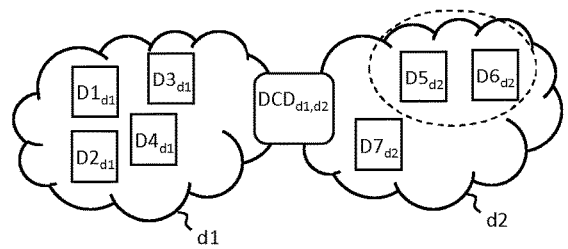

In FIG. 1B, a similar case is shown of a domain d2 comprising devices D5-D7. However, the dual-connection device DCD has stored control information applying to a sub-domain, schematically illustrated by a dashed oval, of devices D5, D6. For the further local devices D1-D4 from network domain d1, control information in the dual-connection device determines that the further local devices D1-D4 may only access services from devices within the sub-domain. For example, the availability of a further user device D5 providing a service is permitted in the control information, whereas the control information indicates that device D7 is not available.

Figure 1C:
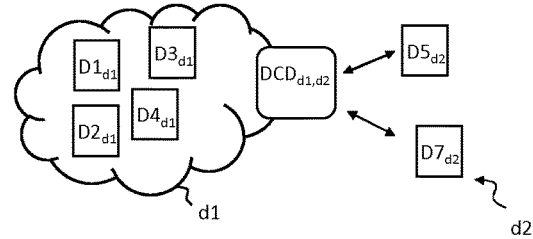

In FIG. 1C, the network domain d2 is defined as a group of devices being part of, for example, a Proximity Services, ProSe, group. The dual-connection device DCD uses direct communication as specified in 3GPP TS 23.303 and/or 3GPP TR 23.752 to communicate with one or more user devices D5, D7 in domain d2. These user devices are part of a ProSe Group identified by a ProSe Group ID. The dual-connection device DCD may use a ProSe Group IP multicast address for the direct communication to these further user devices D5, D7. The user devices D5, D7 in the ProSe Group may have been provided with encryption keys for the ProSe Group to ensure that data exchanged between the further user devices and the dual-connection device DCD can only be received by the further user devices in the group and cannot be intercepted by other devices in the telecommunications network.

Figure 1D:
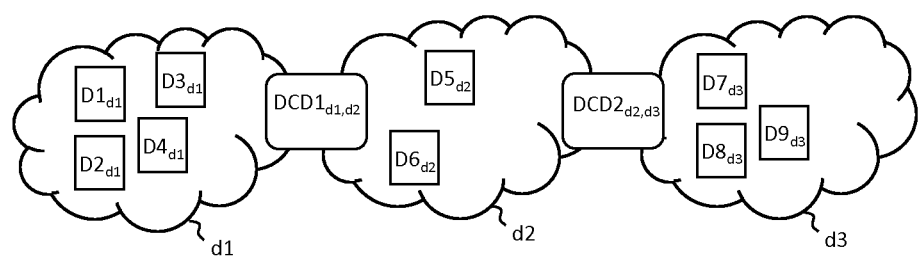

In FIG. 1D, a situation is shown, wherein two dual-connection devices DCD1, DCD2 connect three network domains d1, d2 resp. d2, d3. Network domains d1, d3 may be domains of wireless LANs whereas domain d2 of the interconnecting network in provided by a telecommunications network as defined by 3GPP. Again, the domain d2 may be a 5G virtual network group defined in a 5G telecommunications network. In that case, the virtual network group comprises devices D5, D6 as well as both dual-connection devices DCD1 and DCD2. In this option, the dual-connection devices DCD1 and DCD2 further extend the range of devices that may receive service broadcasts and/or devices from which the availability of services may be polled. For example, the availability of a file server in device D9 in domain d3 may be broadcast by dual connection device DCD2 in the network domain d2. The broadcast is received by all devices in the network domain d2, including dual-connection device DCD1 that may either broadcast the availability of the file server D9 in network domain d1 or may respond to a poll for a file server from a laptop D3 in domain d1 that a file server is available. Dual-connection device DCD1 may store the availability of services in network domain d2 and/or network domain d3 and control information and/or status information for devices and/or services in these domains.

Figure 2:
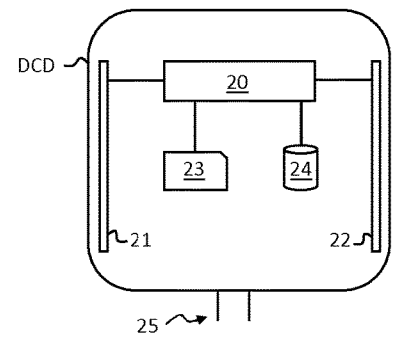
FIG. 2 is a schematic illustration of a dual-connection device according to an embodiment of the invention.

FIG. 2 is a schematic illustration of a dual-connection device DCD as disclosed herein. The dual connection device comprises a processing unit 20 and interfaces 21, 22 to at least two networks, e.g. a local network and a telecommunications network. Different network technologies may be used, possibly in combination, for the local network, for example, 802.x (WiFi), ZigBee, Bluetooth, etc. The dual-connection device DCD may further be configured to register as a User Equipment, UE, in a 3GPP defined telecommunications network, i.e. the dual-connection device DCD complies with the 3GPP standards for communication with a telecommunications network, including the connection of an identification module 23, such as a (U)SIM or eSIM. Furthermore, the dual-connection device DCD may comprise memory 24 for storing control information and/or status information for devices and services in other network domain(s).

Still further, the dual-connection device DCD may comprise a plug connector 25, such that it may be installed in a wall-socket in a building and can be easily connected to power and be available at all times.

In FIG. 2, the dual-connection device DCD is a stand-alone, self-contained device to be positioned in, e.g. a building having a local network. However, in another embodiment, the dual-connection device DCD may also be integrated in a device in a network domain, e.g. in a printer, a network attached storage or in any other device. In yet another embodiment, the dual-connection device, or its function, may be implemented in a gateway device, e.g. in a 5G residential gateway (5G-RG) that itself also provides the local network.

The dual-connection device DCD may be a UE of a subscriber.

FIG. 3A is a schematic illustration of a 5G network architecture 1 according to the prior art. The network is composed of a 5G access network 2 and a 5G core network (5GC) 3. The access network is made up of a new-generation radio access network (NG-RAN) which uses the 5G new radio interface (NR). The NG-RAN comprises 5G base stations, referred to as gNB's (not shown) which are connected to the 5GC and to each other. The different network entities are connected by an underlying IP or Ethernet transport network. The 5G network architecture is connected to a plurality of data networks DN. Data networks can be the internet, an operator specific network, a dedicated network, etc.

FIG. 3B shows a 5GC in a service-based architecture in combination with a UE and access network (R)AN. The dual-connection device may operate as a UE for a part of the network connection toward the telecommunications network. The 5GC comprises many systems that are defined in terms of network functions (NF) that provide services as sets of interactions between two or more network functions. The upper part of FIG. 3B shows a set of network functions that form the 5G control plane CP. Amongst others, the control plane comprises an access and mobility management function (AMF) that handles most signalling coming from and going to the UE. The AMF also interacts with other functions in the control plane. The AMF does not handle session management but forwards session-related messages to and from a system performing a session management function (SMF), hereinafter referred to as session management system. The SMF performs establishment, modification and release of PDU sessions. The control plane may also comprise a system performing a policy control function (PCF) that provides policy rules (QoS, filtering, charging) to other control plane functions, such as the SMF. The 5G Policy Architecture is defined in more detail in 3GPP TS 23.503. Further functions that are comprised in the control plane include the unified data management function (UDM) and the authentication server function (AUSF). The UDM is partly equivalent of the home server system HSS in 3G and 4G networks and is a repository for UE-related information, such as credentials, identifiers, AMF details, and SMF PDU sessions. The UDM may also contain information for the definition of groups of user devices that are part of a virtual network group. The AUSF supports authentication for 3GPP and non-3GPP access.

For the user plane UP, the lower part in FIG. 3B, the UE communicates via the access network 2 with a system performing a user plane function (UPF). Data is tunneled between the access network and the UPF, sometimes referred to as the NG-U tunnel. The main task of the UPF is to process and forward user data. The UPF is controlled by the SMF and connects with external data networks DN.

The system performing the session management function SMF has the responsibility for setting up connectivity for the UE toward data networks as well as managing the user plane for that connectivity. In order to connect to a DN, the UE requests establishment of a packet data unit (PDU) Session. The PDU is the basic end-user protocol type carried by the PDU session, e.g. IP packets or Ethernet frames. Each PDU session provides an association between the UE and a specific DN.

Figure 3C:
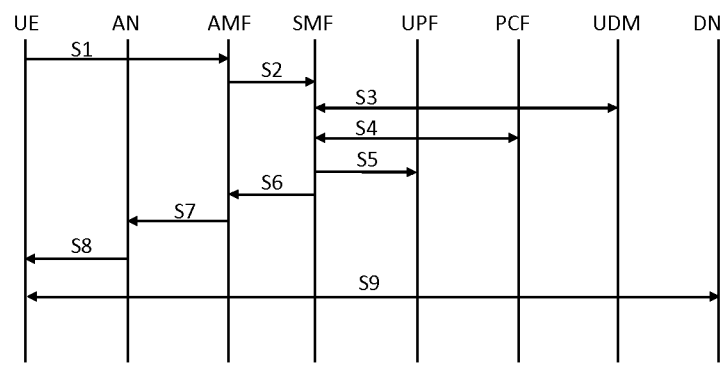
FIG. 3C is a schematic illustration of a PDU session establishment request in a 5G network.

FIG. 3C provides a simplified PDU Session Establishment procedure as set out in more detail in 3GPP TS 23.502, v16.3.0. The procedure may, for example, be carried out by the dual-connection device DCD as disclosed herein and/or by devices in a telecommunications network to connect to a virtual network group.

In step S1, a UE transmits a PDU Session Establishment Request after the UE is registered with the 5GC sending a registration request to the AMF. The PDU Session Establishment Request is transmitted as a session management container in a NAS message to the AMF. The PDU Session Establishment Request contains the PDU session ID, the Requested PDU Session Type, and, possibly, a data network name (DNN), such as a virtual network name corresponding to a user device group. The PDU Session ID is a unique identifier generated by the UE that is different for different PDU sessions. When the access network receives the PDU Session Establishment Request, the NAS message is encapsulated in an N2 message towards the AMF.

The AMF selects an SMF as described in 3GPP TS 23.501 and may either use a DNN provided by the UE or select a (default) DNN using e.g. subscription information from UDM, e.g. information of the virtual network group. In step S2, the AMF sends a message Nsmf_PDUSession_CreateSMContext Request to the SMF containing the PDU Session Establishment Request, DNN information regarding, e.g. the virtual network group, a PCF ID, etc. when the AMF is not already associated with an SMF. Else, the AMF sends a message Nsmf_PDUSession_UpdateSMContextRequest to the SMF.

The SMF may also interact with the UDM and PCF based on the data provided by the UE as can be observed from steps S3 and S4 to obtain subscription data and policy rules. These steps may include checking whether subscription information indicated that the UE is allowed to establish a PDU session to the specific DNN, e.g. for the virtual network group or 5GLAN.

In step S5, the SMF interacts with the UPF to establish a session for the user plane. The SMF sends an N4 Session Establishment Request to the selected UPF and provides packet detection, enforcement and reporting rules to be installed on the UPF for this PDU Session if the Request Type is "Initial Request". Otherwise, the SMF sends an N4 Session Modification Request. The UPF acknowledges the respective request with an N4 Session Establishment/Modification Response. In this procedure, the SMF obtains tunnel information from the UPF.

In step S6, the SMF interacts with the AMF. Following the successful creation of a tunnel end point, the SMF sends Namf_Communication_N1N2MessageTransfer with tunnel information for N2 message and PDU session details in N1 Container and provide the representation of the SM context or updated SM context to the AMF.

In step S7, the AMF sends a N2 PDU Session Setup Request to the appropriate gNB of the access network AN along with N2 session management parameters received from SMF as QFIs, QoS Profile. The transmission from the AMF to the access network AN also includes the NAS message destined to the UE, including session parameters like QoS Rules and UE IP address.

The gNB establishes the tunnel based on the information received from the AMF and sets up a tunnel end point and forwards information to the UE for setting up a PDU session in step S8. The gNB also reports back to the AMF that subsequently informs the SMF about the successful setup of the tunnel.

After this step, the tunnel is established and the PDU session exists between the UE and the UPF allowing data transfer with the DN, indicated by step S9. The data network DN may be the virtual network associated with the group of devices forming a domain in the telecommunications network.

Figure 3D:
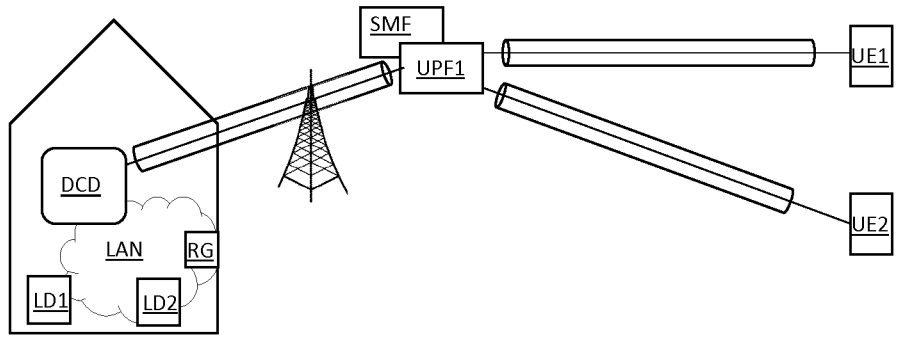
FIG. 3D is a schematic illustration of a dual-connection device having an established PDU connection to a 5G network for a virtual network containing further user devices.

FIG. 3D is a schematic illustration of an embodiment according to the present disclosure wherein a dual-connection device DCD is part of a local area network LAN provided by a residential gateway RG together with two further local devices LD1 and LD2, e.g. a printer and a laptop. In addition, dual-connection device DCD is also part of a 5G virtual network group together with further user devices UE1 and UE2 having established PDU sessions with the SMF so that data traffic may occur with the closed group via the UPF as shown in FIG. 3D. Accordingly, service broadcasts for services of further local devices LD1, LD2 can be performed in the closed group of user devices UE1 and UE2 in the telecommunications network and vice versa. Service broadcast messages sent via the PDU session by the DCD using an IP broadcast address or IP multicast address will be duplicated by the UPF with copies sent to both UE1 and UE2. Likewise, further user devices UE1, UE2 in the telecommunications network may poll the DCD for services and may subsequently receive information about further local devices and/or services thereof in the local area network LAN.

The dual-connection device DCD may be configured to filter what devices/services of the local area network are available in the domain in the telecommunications network and vice versa to access a service. The dual-connection device DCD may also translate requests for a service (e.g. from a UE of the virtual network group in the telecommunications network) to the appropriate device and service in the LAN.

Figure 4A:
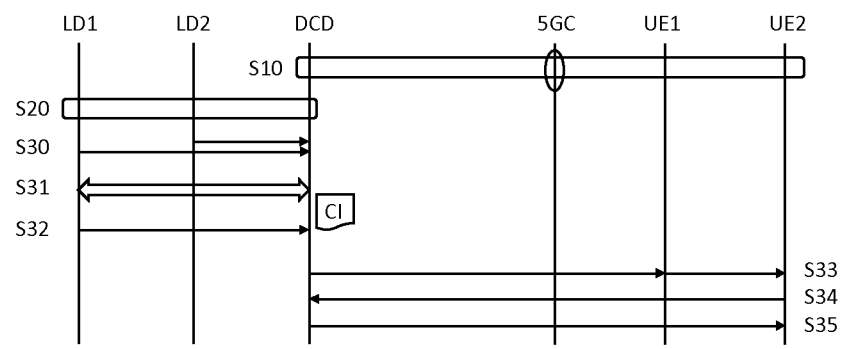
FIGS. 4A-4B are schematic illustrations of some steps of message flows for initial deployment of a dual-connection device.
Figure 4B:
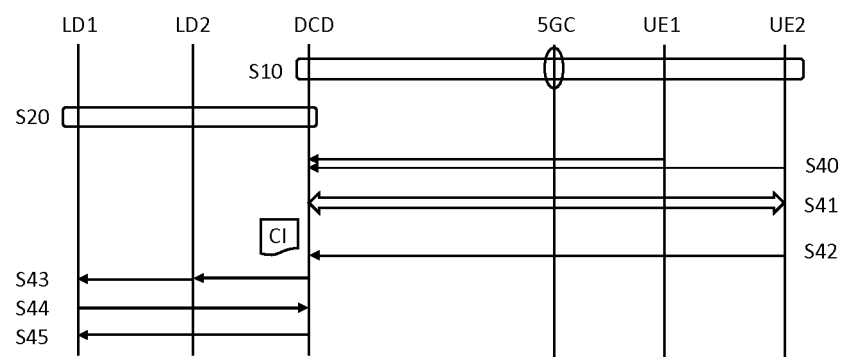

FIGS. 4A-4B are schematic illustrations of some steps of message flows for initial deployment of a dual-connection device DCD. It should be noted that the order of the steps may be changed.

When the dual-connection device DCD is activated/turned on, it joins the 5GLAN (which is part of the subscription information; shown by the oval in the 5GC) and receives a 5GLAN IP-address from the telecommunications network. In FIG. 4A, the dual-connection device DCD is made part of a 5GLAN with user devices UE1 and UE2 as shown by the PDU session establishment procedure S10. The PDU session establishment procedure has been described with reference to FIG. 3C and is executed by each of the dual-connection device DCD, and user devices UE1 and UE2.

Local devices LD1 and LD2 are configured for providing services serv1 and serv2, respectively. The dual-connection device DCD is also added to the local area network, LAN, provided by the residential gateway RG and receives a LAN address (e.g. an IP-address). This is a well-known process, indicated by procedure S20.

The dual-connection device DCD listens to any broadcast from any device on the LAN on what services are offered by the device. This is illustrated in step S30. Alternatively, the dual-connection device DCD may also enforce service polling to check with all devices LD1, LD2 on the LAN what services they offer. These devices report back these service(s), if any, as shown in step S31.

After this initial setup after activation of the dual-connection device DCD, the administrator can access the control information to see what services are available on which local devices LD1, LD2 and then select which service(s) from which device the administrator wants to make available on the 5GLAN. Any service might also be additionally protected by an authorization (name-password or certificate, etc.) to further limit access. A data structure with control information CI is construed that may be stored on the dual-connection device DCD. An administrator may access the data structure to configure the settings of the control information, as shown in step S32, from a local device LD1 (or from any other device that is able to access the dual-connection device DCD).

After the setting of the dual-connection device DCD is configured, the dual-connection device DCD enables these services to be used via the dual-connection device DCD and starts broadcasting the services of the local devices LD1, LD2 to the devices UE1, UE2 on the 5GLAN when permitted by the control information CI in step S33. Alternatively, the user devices UE1, UE2 may poll the dual-connection device DCD for the availability of services in step S34 to which the dual-connection device DCD responds in step S35 for UE2. The dual-connection device DCD may also broadcast available services in the 5GLAN in response to the polling request in step S34, so that UE1 is also informed on available devices/services in the home LAN.

FIG. 4B shows the reverse situation compared to FIG. 4A. In FIG. 4B, services are provided by the user devices UE1, UE2 in the 5GLAN. It should be noted that, in practice, services may be offered from and to both network domains, because the dual-connection device DCD combines the domains to which the dual-connection device DCD is connected for service advertisement, service polling and/or service providing purposes. In other words, FIGS. 4A and 4B may be combined.

Again, after activating the dual-connection device DCD, the dual connection device DCD connects to both the 5GLAN and the home LAN, steps S10 and S20. The dual-connection device DCD listens to any broadcast from any device UE1, UE2 on the 5GLAN on what services are offered by the device. This is illustrated in step S40. Alternatively, the dual-connection device DCD may also enforce service polling to check with all devices UE1, UE2 on the 5GLAN what services they offer. These devices report back these service(s), if any, as shown in step S41.

After this initial setup after activation of the dual-connection device DCD, the administrator can access the control information to see what services are available on which local devices LD1, LD2 and then select which services from which device the administrator wants to make available on the home LAN. Any service might also be shielded by an authorization (name-password or certificate, etc.) to limit access further. A data structure with control information CI is construed that may be stored on the dual-connection device DCD. A user may approach the data structure to configure the settings of the control information, as shown in step S42, from a user device UE1 (or from any other device that is able to access the dual-connection device DCD, for example only from a device in the local network LAN).

After the setting of the dual-connection device DCD is configured, the dual-connection device DCD enables these services to be used via the dual-connection device DCD and starts broadcasting the services of the user devices UE1, UE2 to the devices LD1, LD2 on the LAN when permitted by the control information CI in step S43. Alternatively, the local devices LD1, LD2 may poll the dual-connection device DCD for the availability of services in step S44 to which the dual-connection device DCD responds in step S45 for LD1. The dual-connection device DCD may also broadcast available services in the 5GLAN in response to the polling request in step S44, so that LD2 is also informed on available devices/services in the 5GLAN.

It is noted that the groups of user devices need not be defined as a 5GLAN as shown in FIGS. 4A and 4B. One other example includes the use of Proximity Services, ProSe, groups. In such a case, procedure S10 pertains to the configuration of ProSe communication, wherein the dual-connection device DCD, and UE1 and UE2 are provided with a ProSe Group ID, group-related encryption key(s), ProSe IP multicast address and the network may authorize ProSe communication. For a ProSe group, steps S33, S34 and S44 are broadcast using one-to-many communications.

Figure 4C:
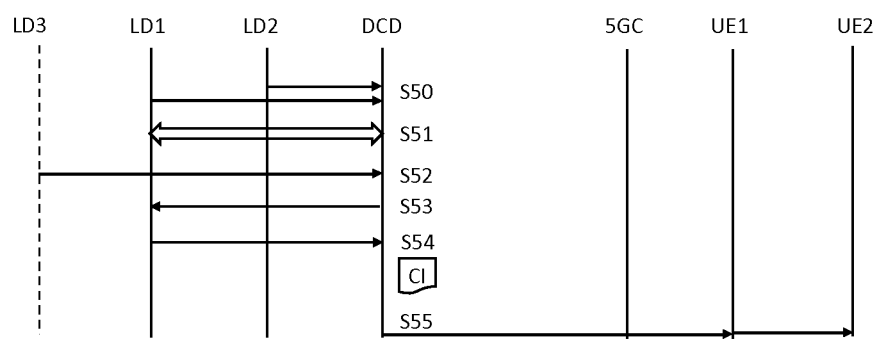
FIG. 4C is a schematic illustration of some steps of a message flow for maintaining control information and/or status information in a dual-connection device.

FIG. 4C is a schematic illustration of some steps of a message flow for maintaining control information and/or status information up-to-date in a dual-connection device DCD. In general, information updates in the dual-connection device DCD are handled by the dual-connection device DCD compiling a new mapping database/file adding new services marked as available. The dual-connection device DCD may deactivate services that are no longer available from being part of the control information and/or status information.

Once the dual-connection device DCD is setup, it may want to maintain the control information and/or status information to detect any (un)available service on the LAN. Also, new LAN devices can be added or new services can be added on existing devices. At the same time some devices may not be powered on and/or be present in the LAN continuously, such as, for example, a laptop. The dual-connection device DCD can hold in the mapping file the devices it has seen before until a manual refresh/reset.

Existing local devices regularly report to the dual-connection device DCD by broadcasting (S50) to the dual-connection device DCD or by regularly polling from the dual-connection device DCD (S51).

When a new local device LD3 is added to the home LAN, it may broadcast its availability and/or services in step S52 within the LAN domain. Alternatively, the dual-connection device DCD may discover the new device LD3 by service polling in the LAN domain.

In step S53, the addition of a new device/service in the LAN is reported by the dual-connection device DCD to a preset device of an authorized user. In step S54, the user may set control information for the new device LD3. The new device may, e.g. be a network attached storage, NAS, and the user may decide that user devices UE1, UE2 may only read (i.e. not store or write to) files from the NAS on LD3.

In step S55, the newly available device/service from LD3 is broadcast in the 5GLAN and, accordingly, received by user devices UE1, UE2.

It should be clear, that devices/services appearing or disappearing from the 5GLAN are handled in a similar manner.

Figure 4D:
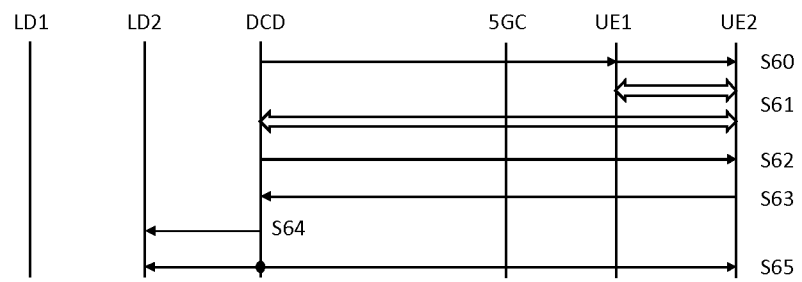
FIG. 4D is a schematic illustration of some steps of a message flow for a service request from a further user device from a user device group for a service of a local device in a local network.

FIG. 4D is a schematic illustration of some steps of a message flow for a service request from a further user device UE2 from a 5GLAN for a service of a local device LD2 in the local network LAN.

In step S60, the dual-connection device DCD broadcasts available services to the user devices UE1, UE2 in the 5GLAN. Alternatively, as also shown as step S61 in FIG. 4D, user device UE2 may poll for services available in the 5GLAN by sending service pollings to UE1 and the dual-connection device DCD and receiving service responses from these devices.

In step S62, the dual-connection device DCD answers the poll of UE2 with all available devices/services on the LAN in accordance with the control information.

In step S63, the dual-connection device DCD receives a service request from UE2 to access a printing service. The dual-connection device DCD verifies whether the service request is received from within the 5GLAN, e.g. by checking if the IP address relates to the PDU session established for the 5GLAN. The dual-connection device DCD may also check whether the service request relates to a service that is allowed for advertisement or service discovery on the 5GLAN. If the checks are positive, the service request is relayed to LD2 in step S64 providing the service. It is noted that checks may not be performed or only one check is performed.

In step S65 the service connection is established between UE2 and LD2 via the dual-connection device DCD, wherein the dual-connection device DCD relays the communications, for example using port forwarding. The local device LD2 may perceive it is providing the service to the dual-connection device DCD and UE2 may perceive it is provided with the service by the dual-connection device DCD.

Figure 5:
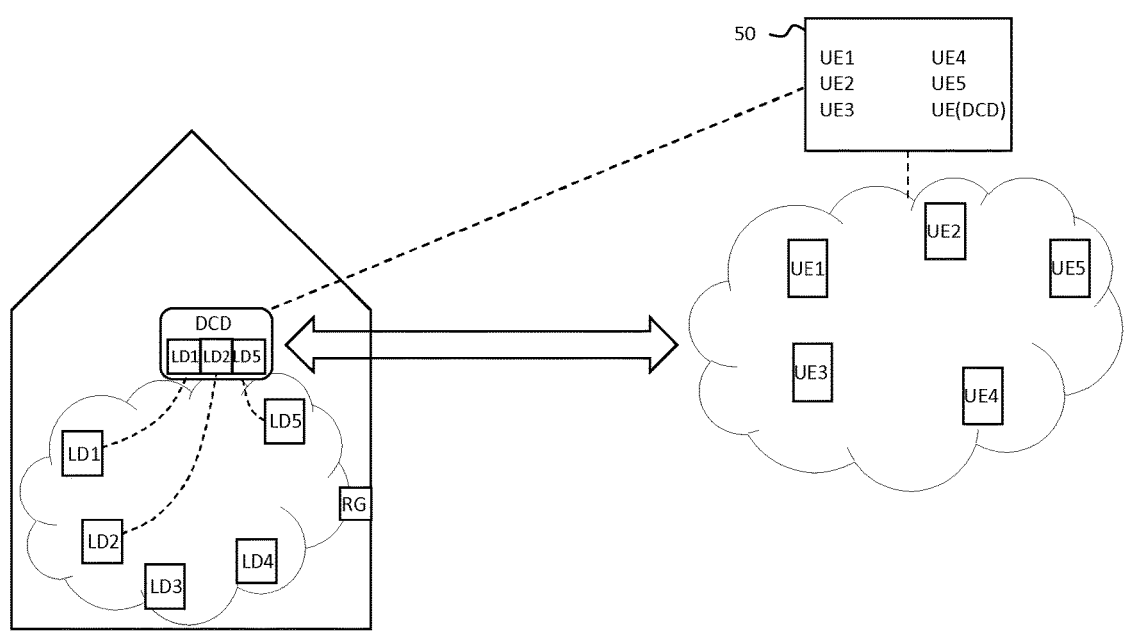
FIG. 5 is a schematic overview of a local area network and a 5G-LAN with some services of local LAN devices attached through a dual-connection device.

FIG. 5 is a schematic overview of a local area network LAN provided by a residential gateway RG comprising local devices LD1-LD6 and a 5G-LAN comprising a plurality of user devices UE1-UE5. The 5G LAN is obtained by defining a relationship in a register 50 between the user devices UE1-UE5 and dual-connection device DCD for the DNN of the group. The dual-connection device DCD is part of both network domains and may be configured to communicate between one or more local devices LD1-LD6 connected to the home LAN in FIG. 5 and devices UE1-UE5 in the public mobile network that are part of a 5GLAN or 5G-VN.

To obtain this situation, in short, the dual-connection device DCD is added to the appropriate or 5G-VN group using session management (3GPP TS23.501, v16.0.0, clause 5.6) and 5G-VN group management (3GPP TS23.501, v16.0.0, clause 5.29). The user device group of the 5GLAN is based on subscription data of the dual-connection device DCD and the UEs stored in the UDM. The dual-connection device DCD may also establish a PDU session with the 5GLAN as described in FIG. 3C.

The dual-connection device DCD is also connected to the home LAN, either per ethernet or Wi-Fi to the RG (or any other technology that comprises a LAN and provides services). The dual-connection device DCD may then receive a broadcast or poll the state of one or more home LAN devices LD1-LD6 and their services. The home LAN devices LD1-LD6 and/or services thereof may then be stored as control information e.g. in a configuration or mapping database accessible to or in the dual-connection device DCD, based, for example, on identifiers like MAC address, IP-address, device name, host name, service, etcetera. For finding the services available in the home LAN various options are possible, be it manual adding them based on identifier (e.g. IP-address, MAC address etc.), or automatic by using bonjour, UPnP, zeroconf, etc. The mapping database/file may be filled during the setup and configuration of the dual-connection device DCD in the home LAN with all available services and related devices in the home LAN and/or in the 5GLAN. The mapping of all LAN devices and their services to the 5GLAN may be adaptable by an administrator to (de-)activate services.

In particular, the administrator or owner of the home LAN may select and/or enable which home LAN devices and/or which services are to be visible and reachable in the 5GLAN. In the example of FIG. 5, the control information is set such that only devices LD1, LD2, and LD5 and/or their services are visible and reachable for further user devices UE1-UE5 in the 5GLAN. In the control information, some services might be shielded from general use in the 5GLAN, and require extra authorization, by use of name-password or certificates, etc.

The dual-connection device DCD can offer a web interface for ease of use by the administrator to check and set which services are available on the 5GLAN. Access to such (web) interface can be limited to LAN devices, or a specific UE(s) on the 5GLAN, or authorized users/devices. For example, the control information may only be settable from the device LD3 (a laptop, for example) and/or the device UE1 (a smart phone from the owner), possibly after providing credentials to the dual-connection device from the respective domains.

The web interface may, in one embodiment, be towards local devices and/or user devices that can get an IP address for the dual-connection device DCD. The user can use one of those local devices or user devices to access the web interface. Another option is that the dual-connection device DCD has a user interface itself (e.g. a touch screen and/or a voice interface) that can be used to set or adapt control information. Access from the LAN or 5GLAN to the dual-connection device DCD may be set as or based on security settings in the dual-connection device DCD.

The dual-connection device DCD may broadcast the availability of devices and/or services in accordance with the control information across the 5GLAN and also provide connection to the available services when requested by polling (preferable by zero touch configuration). When a service broadcasted by the dual-connection device DCD is requested, the dual-connection device DCD relays this to the local device LD1-LD3 providing the service.

The dual-connection device DCD may initially store all services of home LAN devices in a mapping database or file. The administrator can select in this mapping database which services should be available on the 5GLAN by changing this mapping database/file The dual-connection device DCD then enables the selected devices and (subset of) services to be part of the 5GLAN.

The dual-connection device DCD translates any request and traffic to and from the 5GLAN for the selected devices and services on the home LAN and 5GLAN. A firewall function should/could be included. By adding a dual-connection device DCD to a 5GLAN as described, only a selected set of home LAN devices and/or services can be made visible and reachable from the 5GLAN and vice versa.

It is noted that the dual-connection device DCD may be part of any of the local devices LD1-LD6 or its function may be implemented in the residential gateway RG or any other device in the home LAN. The residential gateway RG may additionally have an internet connection next to the connection to the 5GLAN via the DCD (not shown).

After initial setup and configuration, it may occur that one or more new local devices in the local network and/or new user devices in the 5GLAN are added with their services or removed from or powered down in the LAN/5GLAN. In this case the dual-connection device DCD must add or remove/de-activate these services in the internal configuration mapping database (e.g. through broadcasts by the devices and/or by polling by the dual-connection device DCD). Once new services are available to the dual-connection device DCD and in the configuration database, the administrator can then allow the extra services to become available on the 5GLAN (with or without extra authorization) and/or on the home LAN. If services become unavailable in the LAN/5GLAN, the dual-connection device DCD may remove/de-activate the service in the 5GLAN resp. the home LAN.

The dual-connection device DCD may be configured to transmit information to the further user devices UE1-UE5 about at least one of the dual-connection device DCD and the local network. Information regarding the dual-connection device DCD may comprise that the dual-connection device represents a plurality of further local devices LD1, LD2, LD5. Information regarding the local network, may include information about further local devices LD1, LD2, LD5 and/or local services in the local network. The information may, for example, be used by further user device UE1 in the telecommunications network, e.g. in the group of user devices, to adapt further communications.

In FIG. 5, user device UE1 is configured to establish communication in the telecommunications network to a group of devices, e.g. devices in a 5GLAN, that also comprises the dual-connection device DCD, as illustrated by the register 50.

The user device UE1 is configured to receive and process a service advertisement and/or a discovery request from the dual-connection device DCD. The service advertisement from the dual-connection device may relate to further local devices LD1, LD2, LD5 and/or local service of a local network and may be received over the telecommunications network. The discovery request may relate to services of the user device UE1 and is received by UE1 over the telecommunications network from the dual-connection device DCD.

The service advertisement and/or discovery request contain information regarding, for example, the dual-connection device DCD as mentioned above. The information may be a standardized identifier, a reference to information, an identifier or any other information element directly or indirectly providing information about the dual-connection device and/or local network. The information may comprise that the DCD represents one or more local devices in a local network, e.g. that the DCD represents local devices LD1, LD2 and LD5.

The user device UE1 is configured to recognize the information in the service advertisement and/or discovery request, store the information and/or adapt one or more further communications based on the information.

In this manner, the user device UE is informed of the special nature of the dual-connection device in the group of devices, e.g. in the 5GLAN. Adaptation of communications of the user device may involve responding to the discovery request directly to the dual-connection device. The adaptation of the communications may also comprise sending service advertisements and/or discovery requests directly to the dual-connection device DCD. Such direct communications may be sent instead of broadcasting the service advertisements and/or service discovery request within the group of devices to reduce message flows in the group. The direct communication may also be performed in addition to the broadcast of the service advertisements and/or service discovery request.

FIG. 6 is a schematic illustration of a data structure with control information and status information of local devices and local services.

It shows in column 1 the devices in the LAN, in column 2 whether the device is now active (after it was active during a previous scan; status information), then the services that are available on that device. Subsequent columns show which services are active as some might be temporarily unavailable and then which are activated to be used on the 5GLAN. In this example only the print service from the printer is to made available in the 5GLAN as well as media streaming services from the NAS. The mapping table can also hold the IP addresses of the dual-connection device DCD on LAN and 5GLAN side. In case one changes the mapping might be adjusted.

It should be noted that a service might be available, e.g. the print service, but that the printer is out of paper. In that case the normal service interaction could suffice, or additional information from the dual-connection device DCD could be added (e.g. sending an SMS to the administrator when the printer runs out of paper, even before any UE on the 5GLAN requests a print-service). Any experienced change in IP-address of the dual-connection device DCD (LAN or 5GLAN-side) might result in initiating a renewal of the mapping to check available services on the LAN and (re-)broadcast the appropriate services on the 5GLAN.

Authorization for a service can be performed at the LAN device or dual-connection device DCD. If authorization is required in the dual-connection device DCD, the mapping can also hold the UEs that are authorized and that can be set by the admin in the mapping file.

Separately a web interface can be offered for ease of use by the administrator. Access to this web interface can be limited to LAN devices or a specific UE on the 5GLAN or based upon authorization.

An option is to have multiple mapping/configuration files in case the dual-connection device DCD can be used to connect to several 5GLANs. For example, the dual-connection device DCD can be connected to a family 5GLAN and all services are available to all family UEs. The dual-connection device DCD can also be connected to a work-related 5GLAN and only the print-service is available to the UEs in that 5GLAN. From which 5GLAN the dual-connection device DCD receives discovery and service requests can be identified from the PDU session via which these requests are received. Note that the dual-connection device DCD may also establish a PDU session in parallel to another DNN not associated with a 5GLAN, for example to receive software updates. Only discovery and service requests that are received via a PDU session for which there is a mapping/configuration file will be treated by the dual-connection device DCD.

Finally, it is noted that multiple data structures can be provisioned as in FIG. 6 for specific subsets of the 5GLAN.

Figure 7:
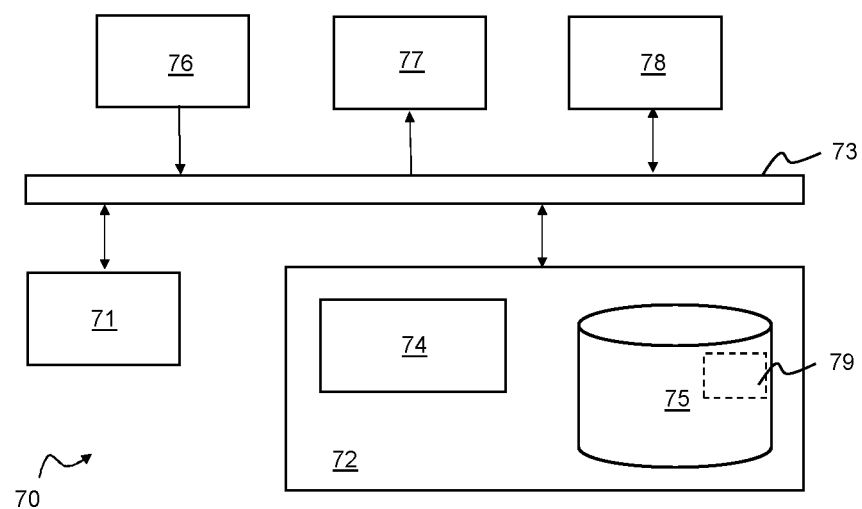
FIG. 7 depicts a processing system according to an embodiment for a dual-connection device, user device or system in a telecommunications network.

FIG. 7 depicts a block diagram illustrating an exemplary processing system according to a disclosed embodiment, e.g. a dual-connection device DCD or a UE, as disclosed herein. As shown in FIG. 7, the processing system 70 may include at least one processor 71 coupled to memory elements 72 through a system bus 73. As such, the processing system may store program code within memory elements 72. Further, the processor 71 may execute the program code accessed from the memory elements 72 via a system bus 73. In one aspect, the processing system may be implemented as a computer system that is suitable for storing and/or executing program code. It should be appreciated, however, that the processing system 70 may be implemented in the form of any system including a processor and a memory that is capable of performing the functions described within this specification.

The memory elements 72 may include one or more physical memory devices such as, for example, local memory 74 and one or more bulk storage devices 75. The local memory may refer to random access memory or other non-persistent memory device(s) generally used during actual execution of the program code. A bulk storage device may be implemented as a hard drive or other persistent data storage device. The processing system 70 may also include one or more cache memories (not shown) that provide temporary storage of at least some program code in order to reduce the number of times program code must be retrieved from the bulk storage device 75 during execution.

Input/output (I/O) devices depicted as an input device 76 and an output device 77 optionally can be coupled to the processing system. Examples of input devices may include, but are not limited to, a space access keyboard, a pointing device such as a mouse, or the like. Examples of output devices may include, but are not limited to, a monitor or a display, speakers, or the like. Input and/or output devices may be coupled to the processing system either directly or through intervening I/O controllers.

In an embodiment, the input and the output devices may be implemented as a combined input/output device (illustrated in FIG. 7 with a dashed line surrounding the input device 76 and the output device 77). An example of such a combined device is a touch sensitive display, also sometimes referred to as a "touch screen display" or simply "touch screen" that may be provided with the UE. In such an embodiment, input to the device may be provided by a movement of a physical object, such as e.g. a stylus or a finger of a person, on or near the touch screen display.

A network adapter 78 may also be coupled to the processing system to enable it to become coupled to other systems, computer systems, remote network devices, and/or remote storage devices through intervening private or public networks. The network adapter may comprise a data receiver for receiving data that is transmitted by said systems, devices and/or networks to the processing system and a data transmitter for transmitting data from the processing system 70 to said systems, devices and/or networks. Modems, cable modems, and Ethernet cards are examples of different types of network adapter that may be used with the processing system 70.

As pictured in FIG. 7, the memory elements 72 may store an application 79. In various embodiments, the application 79 may be stored in the local memory 74, the one or more bulk storage devices 75, or apart from the local memory and the bulk storage devices. It should be appreciated that the processing system 70 may further execute an operating system (not shown in FIG. 7) that can facilitate execution of the application 79. The application 79, being implemented in the form of executable program code, can be executed by the processing system 70, e.g., by the processor 71. Responsive to executing the application, the processing system 70 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 71 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed.

Many modifications and variations will be apparent to those of ordinary skill in the art without departing from the scope of the claims. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A dual-connection device configured to connect both to a local network and a telecommunications network, the dual-connection device comprising:
   a processor;
   a first network interface which connects the dual-connection device to the local network as a local device, the local network connecting the dual-connection device and one or more further local devices providing one or more local services in the local network; and
   a second network interface which connects the dual-connection device to the telecommunications network as a user device, wherein the telecommunications network has registered a user device group comprising the dual-connection device and one or more further user devices in the telecommunications network;
   wherein:
   the dual-connection device is further configured to enable in the telecommunications network advertisement of and/or discovery of at least one of the one or more further local devices and one or more local services available in the local network for the one or more further user devices in the user device group in the telecommunications network by advertising at least one further local device and/or at least one local service by broadcasting information about the availability of the at least one further local device and/or the at least one local service amongst the one or more further user devices in the user device group in the telecommunications network and/or
   the dual-connection device is further configured to enable in the local network advertisement of and/or discovery of at least one of the one or more further user devices in the user device group and one or more services provided by the one or more further user devices for the one or more further local devices in the local network by advertising at least one further user device and/or service of the further user device by broadcasting information about the availability of the at least one further user device and/or service of the further user device amongst the one or more further local devices in the local network.

2. The dual-connection device according to claim 1, wherein the dual-connection device is configured for:
   discovery of at least one further local device and/or at least one local service by receiving a discovery request for availability of the further local device and/or local service from a further user device of the user device group and to provide information about available further local devices and/or local services to the at least one further user device, and/or
   discovery of at least one further user device and/or at least one service of the further user device by receiving a discovery request for availability of the further user device and/or service of the further user device from a local device in the local network and to provide information about available further user devices and/or services of said further user devices to the local device in the local network.

3. The dual-connection device according to claim 1, wherein the dual-connection device is further configured to:
receive a service request from a further user device of the user device group for an advertised or discovered local service of a further local device in the local network and to relay the service request to the further local device in the local network to provide the requested local service to the further user device in the telecommunications network and/or
receive a service request from a further local device in the local network for an advertised or discovered service of a further user device in the user device group and to relay the service request to the further user device in the telecommunications network to provide the requested service of the further user device to the local user device in the local network, wherein the relay of the service request, optionally, includes at least one of adaptation of addresses, filtering of service requests and transmission protocol conversion.

4. The dual-connection device according to claim 1, wherein:
at least one of the further user devices is a further dual-connection device connected to a further local network, distinct from the local network, the further local network connecting the further dual-connection device and one or more further local devices providing one or more local services in the further local network, or
the dual-connection device is configured for device-to-device communication with one or more further user devices in the group of user devices in the telecommunications network, wherein the group of user devices consists of the dual-connection device and two or more further user devices, the dual-connection device is configured for direct one-to-many communication and the group of user devices is a Proximity Services, ProSe, group.

5. The dual-connection device according to claim 1, wherein the dual-connection device is configured to register as a user device in a 3GPP telecommunications network, wherein, optionally, the telecommunications network comprises a 3GPP 5G telecommunications network and the user device group comprises a 5G virtual network group of one or more further user devices.

6. The dual-connection device according to claim 1, wherein the dual-connection device is configured to establish a packet data unit, PDU, session associated with a 5G virtual network group of the one or more further user devices to perform service advertisement and/or service discovery in the established PDU session.

7. The dual-connection device according to claim 1, wherein the dual-connection device is configured to obtain and, optionally, update information about:
available further local devices and/or local services in the local network; and/or
available further user devices and/or services of these further user devices.

8. The dual-connection device according to claim 1, wherein the dual-connection device is configured to:
control advertisement and/or discovery of at least one of the further local devices and local services in accordance with control information, wherein the control information comprises permissions and/or restrictions for advertisement and/or discovery of one or more further local devices and/or local services;
control advertisement and/or discovery of at least one of the further user devices and services of further user devices in accordance with control information, wherein the control information comprises permissions and/or restrictions for advertisement and/or discovery of one or more further user devices and/or services of these further user devices;
control service request processing for a service request from at least one of the further user devices in accordance with control information, wherein the control information comprises permissions and/or restrictions for service requests from one or more further user devices; and/or
control service request processing for a service request from at least one of the further local devices in accordance with control information, wherein the control information comprises permissions and/or restrictions for service requests from one or more further local devices.

9. The dual-connection device according to claim 8, wherein the dual-connection device is configured to perform an authorization procedure:
to control accessing at least one further local device and/or using at least one local service by a further user device in the telecommunications network; and/or
to control accessing at least one further user device and/or using at least one service of a further user device by a further local device in the local network.

10. The dual-connection device according to claim 8, wherein the dual-connection device is configured to store the control information and/or authorization information and to enable setting and/or adaptation of the control information and/or authorization information.

11. The dual-connection device according to claim 8, wherein the dual-connection device is configured to control advertisement and/or discovery of:
at least one of the further local devices and local services in accordance with status information of the one or more further local devices; and/or
at least one of the further user devices and services of these user devices in accordance with status information of one or more of the further user devices.

12. The dual-connection device according to claim 8, wherein a plurality of sets of control information are stored in the dual-connection device, each set being associated with a separate user device group or a sub-group of further user devices of the user device group.

13. The dual-connection device according to claim 1, wherein the dual-connection device is:
a stand-alone device in the local network; or
integrated in a further local device in the local network; or
integrated in a gateway device providing the local network.

14. The dual-connection device according to claim 1, wherein the dual-connection device is configured for transmitting information to the further user devices about at least one of the dual-connection device and the local network.

15. The dual-connection device according to claim 14, wherein the information about the local network is information about further local devices and/or local services in the local network.

16. A system in a telecommunications network storing an identifier of a dual-connection device according to claim 1 connected to both a local network and the telecommunications network, the identifier allocating the dual-connection device to a group of further user devices to allow advertisement from the dual-connection device of further local devices and/or local services in the local network amongst the further user devices of the group of further user devices.

17. A user device comprising:
a processor; and
a network adapter configured for communicating over a telecommunications network, the user device configured to
establish communication in the telecommunications network to a group of devices comprising a dual-connection device, the dual-connection device being connected to a plurality of further local devices in a local network providing one or more local services;
receive and process a service advertisement and/or a discovery request from the dual-connection device, wherein the service advertisement and/or discovery request contains information regarding at least one of:
the dual-connection device, including that the dual-connection device represents the further local devices, and
the local network;
recognize the information in the service advertisement and/or discovery request, and store the information and/or adapt one or more further communications based on the information.

18. The user device according to claim 17, wherein the adaptation of the communications comprises sending service advertisements and/or discovery requests directly to the dual-connection device.

19. The user device according to claim 17, wherein the information regarding the local network contains information about further local devices and/or local services in the local network.

\* \* \* \* \*